United States Patent Office 3,223,707
Patented Dec. 14, 1965

3,223,707
2-(TRIFLUOROBUTENYLMERCAPTO)-PYRIMIDINES
Mervin E. Brokke, Richmond, Calif., assignor to Stauffer Chemical Company, New York, N.Y., a corporation of Delaware
No Drawing. Filed Dec. 23, 1963, Ser. No. 332,857
4 Claims. (Cl. 260—251)

This invention relates to certain new and novel substituted pyrimidines and to the use of such compounds as nematocides. More specifically, the invention relates to compounds of the formula

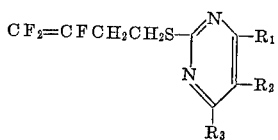

wherein $R_1$, $R_2$ and $R_3$ are hydrogen or lower alkyl radicals.

The compounds of the present invention are new and the preparation thereof can be accomplished in accordance with the following illustrative examples.

Example 1

To a stirred suspension of 19.0 g. of 4-bromo-1,1,2-trifluorobutene-1 and 14.9 g. of 2-mercaptopyrimidine hydrochloride in 200 ml. of methanol was added 8.0 g. of sodium hydroxide dissolved in 50 ml. of water. The resulting mixture was stirred and heated under reflux for two hours. After cooling, the methanol was removed under reduced pressure. The residue was taken up in benzene, and washed with water and dried over anhydrous magnesium sulfate.

The product, 2-(3,4,4-trifluorobuten-3-ylthio)pyrimidine, distilled at 0.8 mm. at 80° C. *Analysis.*—Calculated for $C_8H_7F_3N_2S$: C, 43.4; H, 3.17. Found: C, 43.47; H, 3.06.

Example 2

In a manner analogous to Example 1, 2-mercapto-4-methylpyrimidine hydrochloride and 4-bromo-1,1,2-trifluorobutene-1 were reacted. The product, 4-methyl-2-(3,4,4-trifluorobutene-3-ylthio)pyrimidine, had a boiling point of 78° C. at 0.1 mm. *Analysis.*—Calculated for $C_9H_9F_3N_2S$: C, 46.2; H, 3.85. Found: C, 46.15; H, 3.63.

Example 3

When the general procedure of Example 1 was repeated except that 4,6-dimethyl-2-mercaptopyrimidine hydrochloride and 1,1,2-trifluoro-4-bromobutene-1 were employed, there was obtained 4,6-dimethyl-2-(3,4,4-trifluorobuten-3-ylthio)pyrimidine, $n_D^{30}$ 1.5032.

Compound numbers have been assigned to the above compounds corresponding to the example in which their preparation is described. These numbers will be used to identify the compounds throughout the balance of the application.

As privously pointed out, the herein described toxicants produced in the above described manner are biologically active entities which are useful and valuable in the control of various organisms. The compounds of the invention were tested as nematocides in the following manner.

*Nematocide evaluation test.*—This test determines a chemical's action on root-knot nematodes in the soil. One-pound portions of soil infested with root-knot nematodes are placed in quart jars. The chemical to be tested is pipetted into the nematode infested soil at various dilutions of from 55 to 1 p.p.m. (part per million) or until activity is lost. The soil is sealed for 48 hours after mixing in of the candidate chemical. It is then placed in paper containers. The soil is allowed to stand in the greenhouse one week for airing, after which a tomato plant is transplanted into it. The root-knot nematodes attack the tomato plant roots if they survived the chemical treatment, and cause swelling or knots on the roots. Four weeks after treatment the plant is removed from the soil and the roots inspected. The lowest concentration which prevented nematodes development is recorded. The results are set forth in the table below.

Table

Soil Nematocide Test

| Compound Number | Concentration (p.p.m.) which allowed no Nematode development |
|---|---|
| 1 | [a]1 |
| 2 | [b]2.5 |
| 3 | 25 |

[a] 95% control.
[b] 90% control.

Compounds of the present invention find particular utility as nematocides and may be applied in a variety of ways at various concentrations. They may be combined with suitable carriers and applied as dusts, sprays or drenches. The amount applied will depend on the nature of the utility.

Various changes and modifications may be made without departing from the spirit and scope of the invention described herein as will be apparent to those skilled in the art to which it pertains. It is accordingly intended that the present invention shall only be limited by the scope of the appended claims.

I claim:
1. Substituted pyrimidines corresponding to the formula

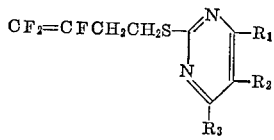

wherein $R_1$, $R_2$ and $R_3$ are selected from the group consisting of hydrogen and lower alkyl radicals.

2. The compound, 2-(3,4,4-trifluorobuten-3-ylthio)pyrimidine.

3. The compound, 4-methyl-2-(3,4,4-trifluorobuten-3-ylthio)pyrimidine.

4. The compound, 4,6-dimethyl-2-(3,4,4-trifluorobuten-3-ylthio)pyrimidine.

References Cited by the Examiner

UNITED STATES PATENTS

| | | | |
|---|---|---|---|
| 2,969,362 | 1/1961 | Tweit | 260—251 |
| 3,002,000 | 9/1961 | Tietze | 260—251 |
| 3,092,545 | 6/1963 | Williamson | 167—33 |
| 3,105,005 | 9/1963 | Cannon et al. | 167—33 |

NICHOLAS S. RIZZO, *Primary Examiner.*